United States Patent

Sudau

[11] Patent Number: 6,003,648
[45] Date of Patent: Dec. 21, 1999

[54] TORQUE CONVERTER

[75] Inventor: Jörg Sudau, Niederwerrn, Germany

[73] Assignee: Mannesmann Sachs AG, Schweinfurt, Germany

[21] Appl. No.: 09/238,336

[22] Filed: Jan. 27, 1999

[30] Foreign Application Priority Data

Jan. 28, 1998 [DE] Germany ............................ 198 03 221

[51] Int. Cl.⁶ .................................................. F16H 45/02
[52] U.S. Cl. ........................ 192/3.29; 192/55.4; 192/208; 464/24
[58] Field of Search ................................ 192/3.28, 3.29, 192/3.3, 30 V, 55.4, 208, 212; 464/24, 68

[56] References Cited

U.S. PATENT DOCUMENTS

| | | | |
|---|---|---|---|
| 5,125,486 | 6/1992 | Murata | 192/3.29 X |
| 5,622,244 | 4/1997 | Hansen | 192/3.29 X |
| 5,655,368 | 8/1997 | Koike et al. | |

FOREIGN PATENT DOCUMENTS 44 24 704  9/1996  Germany .

Primary Examiner—Richard M. Lorence
Attorney, Agent, or Firm—Cohen, Pontani, Lieberman & Pavane

[57] ABSTRACT

A torque converter having a fluid vibration damping arrangement (70) for damping torsional vibrations which lead to relative torsion between an input and an output side of the torsional vibration damper by means of fluid contained in the interior (24) of the casing (12). The fluid vibration damping arrangement is implemented by at least one first blade-like projection, which is coupled in a rotationally fixed manner to a turbine impeller shell (28) of the turbine impeller (26), and extends substantially axially away from said shell and toward the clutch element (44), and at least one second blade-like projection, which is coupled in a rotationally fixed manner to the clutch element (44), preferably attached to the latter, and extends substantially axially away from the latter and toward the turbine impeller (26). The at least one first blade-like projection (74) and the at least one second blade-like projection (72) overlapping in the axial direction in certain regions.

8 Claims, 1 Drawing Sheet

TORQUE CONVERTER

BACKGROUND OF THE INVENTION

1. Field of the Invention

The present invention relates to torque converters, and more particularly to a torque converter having a fluid damping function.

2. Description of the Related Art

DE 44 24 704 C2 discloses a torque converter in which a clutch piston is connected to a turbine impeller hub via a torsional vibration damper. In this case, a hub part of the torsional vibration damper is fixedly coupled to the turbine impeller hub, and two back-shroud parts extending on either side of the hub part are fixedly fitted onto the clutch piston. In the radially outer region, the two back-shroud parts form an annular space which extends around the axis of rotation of the converter and has an approximately square cross section. Arranged in this annular space are individual casing segments, which respectively form a virtually fluidtight inner space, which is open through an opening to the radially inner end. A projection protruding radially outward on the hub part engages in this opening. Coupled to this projection in the inner space is a displacement element, which is at a predetermined distance from the walls bounding the inner space. If torsional vibrations which lead to a relative torsion between the hub part and the two back-shroud parts occur, the hub part engaging in the inner space shifts, with the displacement element mounted on it, in the inner space. The fluid present in the inner space is thereby displaced resulting in a nozzling effect being produced between the displacement element and the walls bounding the inner space. Consequently, vibrational energy can be dissipated by the fluid which is arranged in the inner space and flows through between the wall and the displacement element.

In the case of this known torque converter, the fluid vibration damping arrangement leads to vibration damping proportional to the rate of relative torsion. However, the provision of the fully enclosed inner space with the displacement element movable therein leads to a complex construction with a correspondingly large axial extent.

U.S. Pat. No. 5,655,368 discloses a torque converter in which a plurality of displacement blades extending radially outward are provided on the turbine impeller shell. A plurality of corresponding projections, extending radially inward, are found on the casing. If rotational vibrations occur in the engaged state of the lockup clutch., the blades or projections shift in relation to one another, causing the fluid contained in the interior of the converter to be displaced, which leads to fluid vibration damping. However, there is a problem with this known torque converter in that the fluid damping effect also occurs in the disengaged state of the lockup clutch. The result is that the expected motion of the turbine impeller in the converter is disadvantageously affected.

SUMMARY OF THE INVENTION

It is therefore an object of the present invention to provide a torque converter having a fluid damping function that is simple in construction and is small in size.

This and other objects are achieved according to the invention by a torque converter which comprises a casing having a pump impeller and a plurality of pump impeller blades mounted on the pump impeller; a turbine impeller rotatably arranged about an axis of rotation in the interior of said casing, and having a plurality of turbine impeller blades mounted on said turbine impeller; a lockup clutch for optional coupling of the turbine impeller to the casing, and having a clutch element connected to the turbine impeller via a torsional vibration damper arrangement; and a fluid vibration damping arrangement for damping torsional vibrations which lead to a relative torsion between a torsional vibration damper input side and a torsional vibration damper output side, by means of fluid contained in the interior of the casing.

According to an embodiment of the invention, the fluid vibration damping arrangement comprises at least one first blade-like projection coupled to a turbine impeller shell of the turbine impeller in a rotationally fixed manner, and being preferably attached to said shell. The at least one first blade-like projection extends substantially axially away from said shell toward the clutch element. The fluid vibration damping arrangement further comprises at least one second blade-like projection, which is coupled (or attached) to the clutch element in a rotationally fixed manner, and extends substantially axially away from the clutch element toward the turbine impeller. The at least one first blade-like projection and the at least one second blade-like projection overlap in the axial direction, at least in certain regions.

In the torque converter according to the invention, the fluid vibration damping arrangement is formed by an arrangement of the blade-like projections which lie open toward the casing interior of the torque converter. When there is a relative torsion between the input side and output side of the torsional vibration damper, the blade-like projections must move in the fluid contained in the converter causing the fluid to be displaced, and thereby leads to energy dissipation. The rate-proportional vibration damping is further intensified by the first and second projections axially overlapping and consequently forming between them a space in the circumferential direction. The space can be changed when relative torsion occurs and from which fluid is displaced or into which fluid enters.

To intensify the damping effect, it is proposed that a plurality of first and/or second blade-like projections are distributed in the circumferential direction, and that between respective pairs of first or second projections there engages at least one second or first projection, respectively.

In the case of the torque converter known from DE 44 24 704 C2, stop elements are provided in the radially inner region of the torsional vibration damper. The stop elements form a rotary-path limitation for the torsional vibration damper and prevent the damping springs lying radially outside these stop elements from being fully compressed. In order to provide a simplified construction in the case of the torque converter according to the invention, it is proposed that, when there is relative rotation between the input side and output side of the torsional vibration damper, the first and second projections can come to bear against one another and form a rotary-path limitation for the torsional vibration damper arrangement.

The torque converter according to the invention is preferably designed such that the first and/or second blade-like projections are respectively mounted on a ring-like blade carrier and that the other blade-like projections, respectively, extend up to the ring-like blade carrier. A predetermined axial distance is thereby formed between free ends of the other blade-like projections and the blade carrier. A flow through space for the fluid contained in the interior of the converter is formed between the blade-like projections arranged on one component of the clutch element and the turbine impeller shell and the ring carrier of the projections arranged on the other component of the clutch element and the turbine impeller shell. Thus, when relative torsion occurs between the input and output side of the torsional vibration damper, a throttling effect or a nozzling effect is produced.

In this case, a radial extent of the ring-like blade carrier is preferably substantially equal to a radial extent of the other blade-like projections.

In order to utilize relative torsions occurring between the input side and the output side of the torsional vibration damper to the greatest possible extent for fluid damping, the fluid vibration damping arrangement is radially arranged outside the torsional vibration damper arrangement.

In an embodiment of the torque converter according to the invention, the clutch element is preferably implemented by a clutch piston.

In order to further intensify the fluid damping effect, the clutch element comprises a portion extending, at least in certain regions, axially along the at least one first blade-like projection and/or the at least one second blade-like projection.

The various features of novelty which characterize the, invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, wherein like reference characters,, denote similar elements throughout the several views.

DETAILED DESCRIPTION OF THE PRESENTLY PREFERRED EMBODIMENTS

Figure 1:
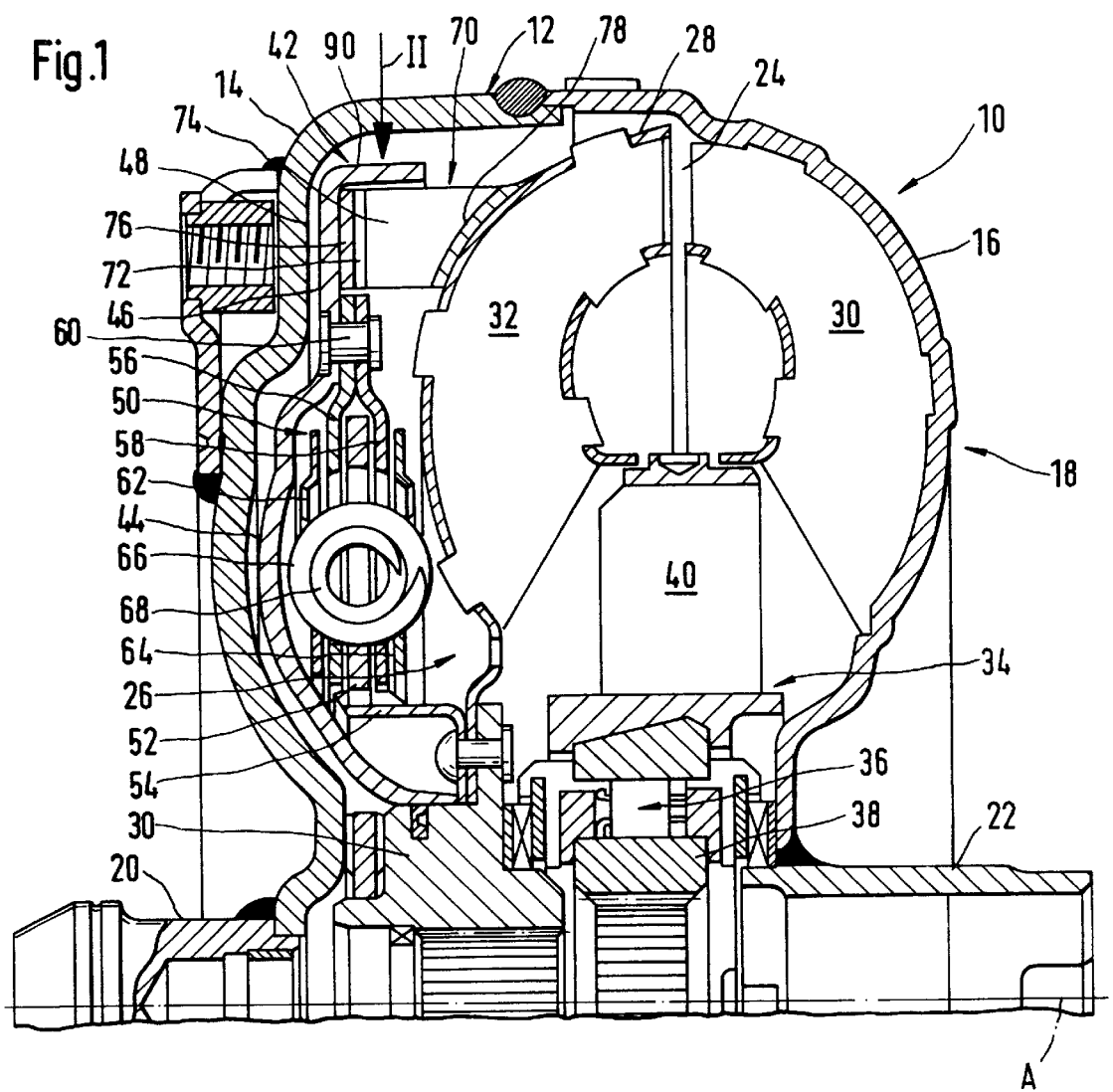
FIG. 1 is a partial longitudinal section through a torque converter according to an embodiment of the invention.

In FIG. 1, a torque converter is denoted generally by 10. The torque converter 10 comprises a casing 12 substantially formed by a cover 14 and a pump impeller shell 16, of a pump impeller denoted generally by 18. The pump impeller shell 16 is fixedly connected to cover 14, for example by welding. In the radially inner region, cover 14 is fixedly connected to a cover hub 20, and pump impeller shell 16 is fixedly connected to a pump impeller hub 22. A fluid pump (not shown) is driven in a way known per se by pump impeller hub 22. The working fluid is introduced by said fluid pump into an inner space 24 of torque converter 10.

Also arranged in the inner space 24 of torque converter 10 is a turbine impeller, generally denoted by 26. The turbine impeller 26 comprises a turbine impeller shell 28 and a turbine impeller hub 30, fixedly connected to the turbine impeller shell on the radial inside. The turbine impeller hub 30 can be connected in a rotationally fixed manner to a converter output shaft, for example a transmission input shaft.

Pump impeller blades 31 and turbine impeller blades 32 are respectively arranged on the pump impeller shell 16 and the turbine impeller shell 28. Arranged in the direction of an axis of rotation A between the pump impeller 18 and the turbine impeller 26 is a stator 34. The stator 34 is rotatably arranged on a stator hub 38 by means of a freewheeling mechanism 36. The stator 34 also bears a plurality of blades, i.e. bears a plurality of stator blades 40.

The torque converter 10 according to the invention also has a lockup clutch, generally denoted by 42. Lockup clutch 42 comprises a clutch piston 44, which is seated in a sealed manner on the turbine impeller hub 30 on its inner radius, but is rotatable with respect to said hub. On the outer radius, clutch piston 44 bears a friction facing or facings 46, which can come to bear against a counter-frictional surface 48, which is formed on a portion of the cover 14 of a planar design. By increasing the fluid pressure in the inner space 24 of torque converter 10, clutch piston 44 is forced to the left in the representation of FIG. 1, resulting in frictional facings 46 bearing against counter-frictional surface 48.

The clutch piston 44 is coupled to turbine impeller hub 30 by means of a torsional vibration damper 50. The torsional vibration damper 50 his a damper hub 52, which engages, in a rotationally fixed manner in its radially inner part, a part 54 fixedly connected to the turbine impeller hub 30. On either side of the damper hub 52 lie back-shroud elements 56, 58, which are fixedly connected in their radially outer region to clutch piston 44 by means of bolts 60.

The torsional vibration damper 50 also comprises intermediate shroud elements 62, 64, which are both rotatable with respect to damper hub 52 and with respect to the back-shroud elements 56, 58. In a way known per se, the respective back-shroud elements 56, 58, intermediate back-shroud elements 62, 64 and the damper hub 52 respectively have spring windows with control edges, on which the springs 66, 68 of a vibration damping spring arrangement can be supported. The torsional vibration damper 50 represented in FIG. 1 is a two-stage type, in which for example a first set of springs, formed by a plurality of springs 66, act between the back-shroud elements 56, 58 and the intermediate back-shroud elements 62, 64, and a second set of springs, formed by a plurality of springs 68, act between the intermediate back-shroud elements 62, 64 and damper hub 52. It should be pointed out here that, with torque converter 10 according to the invention, any type of torsional vibration damper, i.e. single-stage or multi-stage, with any number of vibration damping springs may be provided. It is important, however, that, in the lockup state, i.e. when the lockup clutch 42 is engaged, a fixed connection between converter casing 12 and the turbine impeller hub 30 is formed by the torsional vibration damper 50 such that torsional vibrations occurring in a drive train can be filtered by the torsional vibration damper 50.

Figure 2:
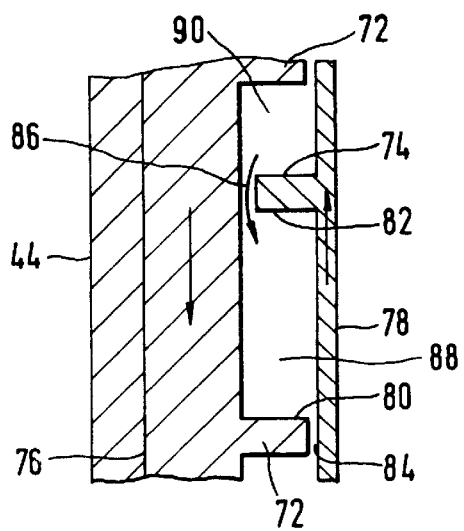
FIG. 2 is a detailed sectional view of the blade-like projections axially engaging one in the other, as viewed along line II in FIG. 1.

A fluid vibration damping arrangement, generally denoted by 70 lies radially outside the connection of the torsional vibration damper 50 to the clutch piston 44, i.e. radially outside the bolts or rivets 60. Fluid vibration damping arrangement 70 comprises a plurality of projections 72 provided on piston 44, extending axially toward the turbine impeller shell 28 and having a preferably uniform distance from one another in the circumferential direction. Furthermore, fluid vibration damping arrangement 70 comprises a plurality of blade-like projections 74 arranged on turbine impeller shell 28 and extending axially toward clutch piston 44. Projections 74 are also arranged at an approximately equal distance from one another in the circumferential direction and are aligned with respect to the projections 72 such that projections 74 and 72 overlap in the axial and radial direction and engage one in the other, as can be seen in FIG. 2. As shown in FIG. 2, the respective projections 72, 74 are mounted on ring-like carriers 76, 78, i.e. they are formed integrally with the respective carrier. The ring-like carriers 76, and 78 are then fixedly connected to the piston 44 and the turbine impeller shell 28 respectively.

It should be pointed out here that it is possible in the same way to fix the individual projections 72 and/or 74 on clutch piston 44 and turbine impeller shell 28 directly, without the respective carriers 76 and 78, for example by welding or the like.

Free ends 80 and 82 of the projections 72 and 74, respectively, extend in the axial direction toward the respective carrier 76 and 78 of the other projections, such that a slight axial intermediate space 84 and 86 is formed between these free ends 80 and 82 and the opposite carriers 78 and 76, respectively. The fluid vibration damping arrangement 70 is essentially effective only in the engaged state of lockup clutch 42, in which clutch piston 44, and consequently also the projections 72 provided on carrier 76, is shifted to the greatest extent to the left in the representation of FIGS. 1 and 2. Thus, in the disengaged state of lockup clutch 42, carrier 76, which is fixed on the piston 44, bears directly against projections 74. The projections 74 then form a rotary-path limitation for piston 44 of lockup clutch 42. Consequently, in the engaged state of the lockup clutch 42, the smallest possible intermediate spaces 84 and 86 can be obtained. This is of significance, since, when there is relative torsion between an input side of the torsional vibration damper, for example the back-shroud elements 56, 58, and an output side of the torsional vibration damper, for example the damper hub 52, a nozzling or throttling effect is obtained through these distances 84 and 86, as shown by the arrows in FIG. 2. That is, when there is relative torsion between the carriers 76 and 78, chambers 88 and 90 lying respectively between projections 74 and 72 directly neighboring one another in the circumferential direction are reduced or enlarged. In the representation of FIG. 2, the chamber 90 is reduced, and the chamber 88 is enlarged. In this case, the fluid contained in chamber 90 is forced to flow through intermediate space 86 into chamber 88. This forced flow causes the vibrational energy to dissipate. Thus, the greater the relative rate of rotation between the input side and the output side of the torsional vibration damper, the greater the energy removal. The fact that the intermediate spaces 84, 86 are designed to be as small as possible has the effect that the greatest possible throttling effect is obtained in this region. It is similarly possible, however, not to reduce the intermediate spaces 84, 86 to zero while the lockup clutch 42 is in the disengaged state. This depends, in each case, on the desired damping characteristics to be provided.

To intensify the throttling effect still further, the clutch piston 44 has an approximately cylindrical axially extending portion 92 in its radially outer region. As can be seen in FIG. 1, this portion 92 runs toward the turbine impeller shell 28 at a small radial distance from projections 74. This results in the creation of a throttling effect even in the radially outer region between the projections 74. That is, the radially outer regions of projections 74 and an inner surface of the cylindrical portion 92 of piston 44.

The torque converter 10 according to the invention provides a fluid vibration damping arrangement which does not require additional installation space in the converter casing 12 and which, moreover, is of a simple construction. In addition to the provision of the fluid damping proportional to the relative rate of rotation, a rotary-path limitation for the torsional vibration damper 50 is formed by the fluid vibration damping arrangement 70 (i.e. the projections 72 and 74 axially engaging one in the other). Thus, if the relative torsion between the input side and ouput side of the torsional vibration damper reaches a predetermined maximum extent, projections 72 and 74 strike one another and consequently prevent any further relative torsion between the input side and output side of the torsional vibration damper.

This prevents the springs 66, 68 of the torsional vibration damper 50 from being fully compressed and possibly damaged in the process. Therefore, any additional elements assuming the function of the rotary-path limitation are not required. This leads to a further simplified construction of the torque converter 10.

Since the fluid vibration damping arrangement 70 according to the invention can be arranged in the radially outer region of the installation space without requiring additional space, any relative torsion occurring in the torsional vibration damper 50 can be used to the greatest possible extent for providing the fluid damping effect.

It is pointed out that the assignment of the expressions "torsional vibration damper input side" and "torsional vibration damper output side" is not restricted to the foregoing relationship. It is self-evident that, depending on the direction of torque introduction, a different assignment of these terms to the various components is also possible.

As a result of the fact that the fluid vibration damping arrangement according to the invention is substantially effective only when lockup clutch 42 is in the engaged state, when lockup clutch 42 is in the disengaged state the turbine impeller 26 can rotate with respect to the casing in the interior of the converter without being impeded by the fluid vibration damping arrangement 70. The reason for this is that, in the disengaged state, of the lockup clutch 42, the entire torsional vibration damper 70 and the clutch piston 44, and consequently the projections (72, 74), turn as one structural unit with the turbine impeller 26 and, on account of the viscous damping, act as a broad-band absorber.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:
1. A torque converter comprising
   a casing having a pump impeller and a plurality of pump impeller blades mounted on said pump impeller;
   a turbine impeller rotatably disposed about an axis of rotation in an interior of said casing, and having a plurality of turbine impeller blades and a turbine impeller shell;
   a lockup clutch for optionally coupling said turbine impeller to said casing, the lockup clutch having a clutch element connected to the turbine impeller via a torsional vibration damper; and
   a fluid vibration damping arrangement having a fluid disposed in the interior of said casing for damping torsional vibrations resulting in a relative torsion between an input side and an output side of the torsional vibration damper, said fluid vibration damping arrangement comprising:

at least one first blade-like projection coupled to said turbine impeller shell in a rotationally fixed manner and extending substantially axially away from said turbine shell toward said clutch element;

at least one second blade-like projection coupled to said clutch element in a rotationally fixed manner and extending substantially axially away from said clutch element toward said turbine impeller, said first and second blade-like projections overlapping in an axial direction in at least one region.

2. The torque converter according to claim 1, further comprising a plurality of first and second blade-like projections circumferentially distributed on said turbine impeller shell and said clutch element, respectively, wherein at least one of said first or second blade-like projections engages between respective pairs of said second or first blade-like projections, respectively.

3. The torque converter according to claim 2, wherein said first and second blade like projections form a rotary path limitation for the torsional vibration damper by bearing against each other in response to relative torsion between the input and output side of the torsional vibration damper.

4. The torque converter according to claim 2, further comprising:

a first ring-like blade carrier mounted on said turbine shell and having said first blade-like projections extending axially therefrom;

a second ring-like blade carrier mounted on said clutch element and having said second blade-like projections extending axially therefrom;

said first blade-like projections having a free end being spaced from said second ring-like carrier by a predetermined axial distance, said second blade-like projections having a free end being spaced from said first ring-like carrier by a predetermined axial distance.

5. The torque converter as claimed in claim 4, wherein said first ring-like blade carrier comprises a radial distance corresponding to a radial distance of said second blade-like projections, and said second ring-like carrier comprises a radial distance corresponding to a radial distance of said first blade-like projection.

6. The torque converter as claimed in claim 1, wherein said fluid vibration damping arrangement is radially arranged outside said torsional vibration damper.

7. The torque converter as claimed in claim 1, wherein said clutch element comprises a clutch piston.

8. The torque converter as claimed in claim 1, wherein said clutch element comprises a substantially cylindrical portion axially extending in regions along said at least one first and/or said at least one second blade-like projections.

* * * * *